Oct. 24, 1967         W. H. HALL ETAL         3,348,656
                      CONVEYOR APPARATUS
Filed Nov. 25, 1966                          2 Sheets-Sheet 1

INVENTORS
WILLIAM H. HALL
JON D. HALL
BY
Learman, Learman & McCulloch

Oct. 24, 1967  W. H. HALL ET AL  3,348,656
CONVEYOR APPARATUS

Filed Nov. 25, 1966  2 Sheets-Sheet 2

INVENTORS
WILLIAM H. HALL
JON D. HALL
BY
Leaman, Leaman & McCulloch

United States Patent Office 3,348,656
Patented Oct. 24, 1967

3,348,656
CONVEYOR APPARATUS
William H. Hall, 808 Congress St., and Jon D. Hall, 7245
Ronald Drive, both of Saginaw, Mich. 48602
Filed Nov. 25, 1966, Ser. No. 597,015
5 Claims. (Cl. 198—64)

ABSTRACT OF THE DISCLOSURE

Apparatus for conveying ice cubes from a hopper having an open top trough into which the tubes descend by gravity and from which the cubes are conveyed by a screw mechanism into and through a tubular housing, the screw having a continuous vane of uniform diameter except at the juncture of the trough and the housing at which the vane has a reduced diameter portion such that the radial distance from the reduced vane to the inner surface of the housing corresponds substantially to the thickness of the cube.

---

This invention relates to conveyor apparatus and more particularly to screw or auger conveying mechanism especially adapted for use in conjunction with the conveying of ice cubes and other blocklike materials.

Screw or auger conveyors of the kind employing a helical vane secured to a rotatable shaft have not heretofore been used successfully in the conveying of block materials such as ice cubes. One reason for this is that relative rotation between the vane and the annular housing into which the blocks are delivered frequently results in jamming of one or more blocks between the open end of the housing and the vane. Such jamming may result in damage to the housing, to the vane, the vane driving mechanism, the block or blocks which cause the jam, or a combination of all of these undesirable characteristics. Moreover, it is not uncommon for ice cubes to fuse to one another and form a bridge over the auger at the base of the hopper, thereby preventing admission of the cubes to the conveyor.

An object of this invention is to provide a screw conveyor mechanism which is especially adapted for use in conjunction with the conveying of blocklike material.

Another object of the invention is to provide screw conevyor mechanism which is so constructed as to eliminate jamming of the block material between the auger vane and the housing through which the material is conveyed.

A further object of the invention is to provide screw-type, block conveying mechanism which eliminates or greatly minimizes breaking of the blocks.

Another object of the invention is to provide conveying mechanism of the character described which is self-contained and which is capable of being mounted on and removed from material storage apparatus as a unit.

Other objects and advantages of the invention will be pointed out specifically or will become apparent from the following description when it is considered in conjunction with the appended claims and the accompanying drawings, in which:

Figure 1:
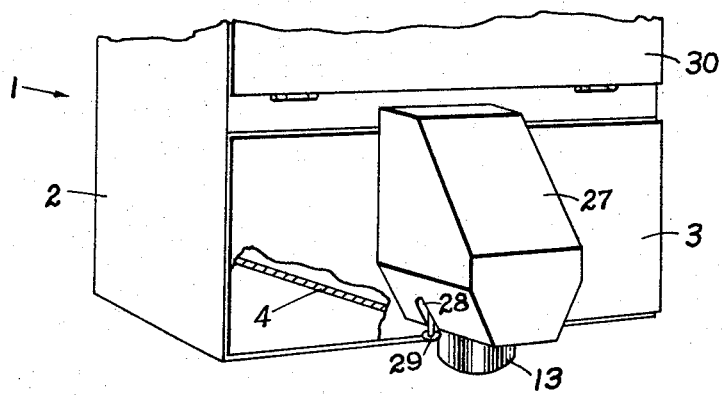
FIGURE 1 is a fragmentary, isometric view of a typical storage and dispensing apparatus equipped with conveying mechanism constructed in accordance with the invention.
Figure 2:
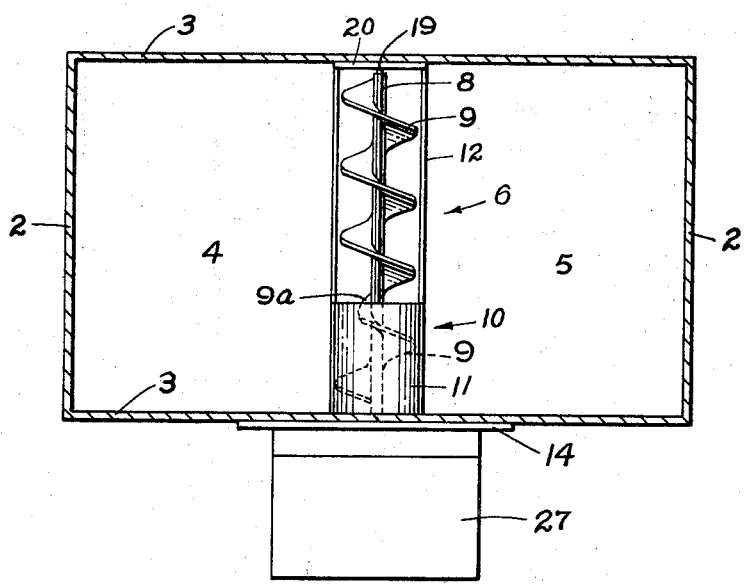
FIGURE 2 is a transverse sectional view of the apparatus shown in FIGURE 1.

Apparatus constructed in accordance with the invention is adapted for use in conjunction with a storage bin or housing 1 having side walls 2, front and rear walls 3 and downwardly inclined bottom wall members 4 and 5 which converge toward one another to form a hopper bottom for the bin 1. The confronting ends of the bottom wall portions 4 and 5 are spaced apart from one another.

Conveying mechanism constructed in accordance with the invention is designated generally by the reference character 6 and includes an auger 7 having a hollow, rotatable shaft 8 on which is secured a helical vane 9. The auger 7 is mounted in a combined trough and housing member 10 comprising a sleeve or housing portion 11 to one end of which is joined a semicircular trough portion 12. The other end of the housing is open. Preferably, an annular spout or chute member 13 is secured to the open end of the sleeve 11 and extends at right angles thereto. Welded or otherwise suitably fixed to the housing 11 is a mounting flange 14 to which is secured an angle bracket 15 having a horizontal leg 16 and a vertical leg 17 which parallels the axis of the spout 13. Secured to the bracket leg 17 is a reduction gear drive unit 18 of known construction to the output shaft of which is connected one end of the auger shaft 8. The opposite end of the shaft 8 is journaled on a bearing 19 carried by an end wall 20 which is secured to the trough portion 12.

The drive unit 18 includes an input shaft 21 which is connected via a pulley 22 and a belt 23 to a pulley 24 that is fast on the armature shaft 25 of an electric motor 26. The arrangement is such that operation of the motor 26 effects driving of the shaft 21 which in turn effects rotation of the shaft 8 and corresponding rotation of the vane 9 in such direction as to feed any material in the trough 12 toward the housing portion 11 for discharge through the chute 13.

Figure 4:
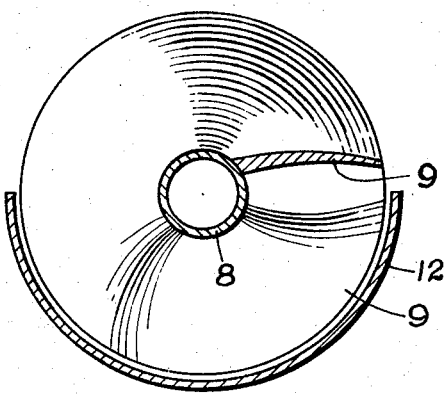
FIGURE 4 is a sectional view taken on the line 4—4 of FIGURE 3.
Figure 5:
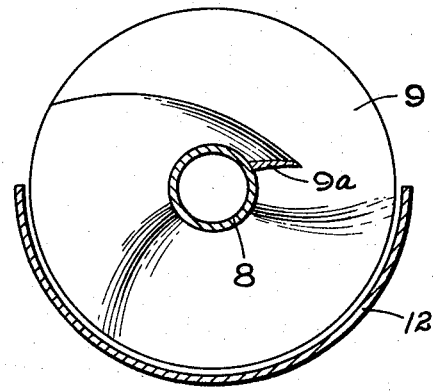
FIGURE 5 is an enlarged, sectional view taken on the line 5—5 of FIGURE 3.

A particularly important characteristic of the invention is that a portion of the vane 9 has a lesser radial dimension than the remaining portion of the vane. This characteristic of the invention is best illustrated in FIGURE 5 wherein the radially reduced vane portion is designated by the reference character 9a. A comparison of FIGURES 4 and 5 reveals that the radial dimension from the axis of the shaft 8 to the tip of the vane portion 9a is slightly less than half the radial dimension from the axis of the shaft 8 to the tip of the vane 9. The radius of the vane portion 9a, however, may be different, as will be explained in more detail hereinafter.

Another important characteristic of the invention is the location of the vane portion 9a with respect to the inlet end of the annular housing portion 11. Preferably, the vane 9a is so located that the inlet end of the housing 11 is equidistant the opposite ends of the vane 9a. That is, the vane 9a has a helical length, half of which is located outside the housing 11 and half of which is located inside the housing. The helical length of the vane 9a may vary, but it should be no less than 180° and need be no more than 360°.

The vane 9 has several convolutions located within the sleeve 11 and, from the terminal end of vane portion 9a, the remaining vane convolutions have the same radial dimension as the other vane convolutions 9.

Figure 3:
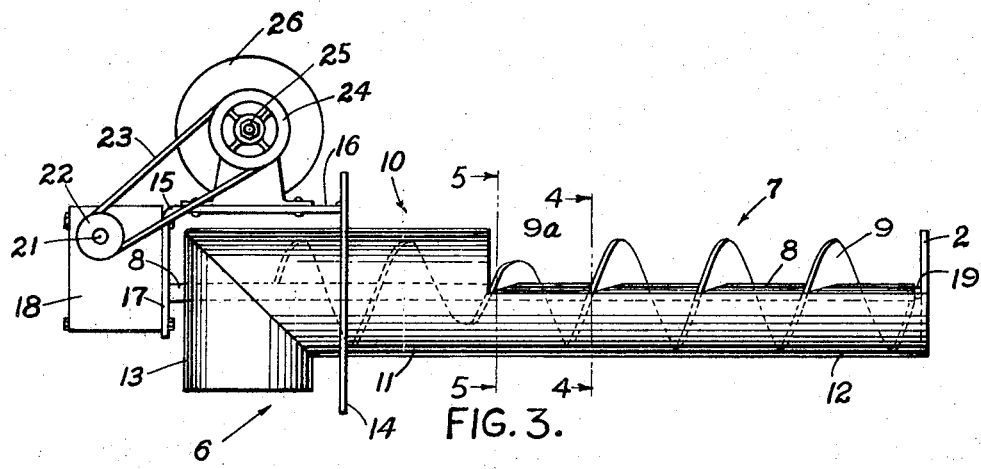
FIGURE 3 is a side elevational view of conveying mechanism constructed according to the invention.

The conveying mechanism 6, including all of the parts shown in FIGURE 3, constitutes a unitary assembly and may be inserted in the housing 1 through an opening in the front wall 3 to occupy a position between the confronting ends of the bottom members 4 and 5, the arrangement being such that the contents of the housing 1 may be delivered by gravity along the inclined bottom members 4 and 5 to the trough portion 12. Suitable nuts and bolts (not shown) secure the mounting flange 14 to the front wall 3. Preferably, a removable cover 27 overlies the motor 26 and its associated mechanism and is provided with an opening 28 through which a motor control switch operator 29 extends.

In the operation of the apparatus, ice cubes or other blocklike material may be introduced to the storage bin 1 through a doorway formed in the front wall 3 and which normally is closed by a door 30. Alternatively, the bin 1 may be filled from above. The block material will be delivered by gravity to the trough portion 12 so as to fill the latter between adjacent vanes 9. Rotation of the motor 26 in such direction as to feed the material in the trough toward the chute 13 will cause the blocks located above the vane 9 to be agitated somewhat, thereby overcoming the tendency of ice cubes, for example, to adhere to one another and form a bridge over the trough 12.

At the inlet end of the cylindrical housing 11 the cubes or blocks would tend to jam between the inlet end and the immediately adjacent external vane 9 were it not for the reduced radial dimension thereof. Because of the lesser radial dimension of the vane 9a, this jamming tendency is overcome, thereby preventing breakage of the cubes, damaging of the housing 11, shearing of the connection between the shaft 8 and the output shaft of the reduction unit 18, and possible damaging of the motor 26. As a result of the reduced radial dimension of the vane 9a, block material thus can be introduced to the housing 11 without difficulty.

As has been pointed out, those convolutions of the vane 9 within the housing 11 and extending from the reduced portion 9a thereof have radial dimensions corresponding to the dimension of the vanes 9 located outside the housing 11. The purpose of this construction is to assure delivery of all block material within the housing to the discharge chute 13.

The radial length of the vane portion 9a will depend upon the size of the block material to be conveyed. For example, if the block material constitutes ice cubes 1¼ inches thick, the radial length of the vane portion 9a should be such that at least 1¼ inches clearance exists between the tip of the vane 9a and the inside wall of the housing 11. In other words, the construction should be such that the clearance between the vane 9a and the inner surface of the tubular housing corresponds at least to the thickness of the block material to be conveyed.

An important advantage of the unitary construction of the conveying mechanism is that it enables all of the parts of the driving mechanism to be located externally of the bin 1, thereby minimizing greatly the possibility of contaminating the contents of the bin. Another advantage of the unitary construction is that it facilitates greatly repair and maintenance of the driving motor and its associated parts. In addition, the exchange of one conveyor mechanism for another, in the event such an exchange is necessary, is greatly facilitated inasmuch as all of the mounting and securing devices are located externally of the housing.

The disclosed embodiment is representative of a presently preferred form of the invention, but is intended to be illustrative rather than definitive thereof. The invention is defined in the claims.

We claim:
1. Cube dispensing and conveying apparatus comprising a cube storage bin having a hopper bottom; an open top, substantially horizontal trough at the bottom of said hopper for receiving cubes from said bin; an annular housing forming a continuation of said trough and extending beyond said bin; screw conveyor means spanning the length of said trough and extending through said housing for delivering cubes from said trough into and through said housing; and driving means connected to said conveyor means for rotating the latter in a direction to deliver cubes to and through said housing, said conveyor means comprising a shaft extending the full length of said trough and said housing and having a helical vane extending continuously from one end of said shaft to the other, said vane having a uniform diameter corresponding substantially to the diameter of said housing except at the juncture of said trough and said housing at which juncture said vane has a portion of reduced diameter such that the radial dimension from said reduced vane portion to the inner surface of said housing corresponds substantially to the thickness of one of said cubes.

2. The apparatus set forth in claim 1 wherein the reduced vane portion extends axially of said shaft substantially equal distances on opposite sides of the juncture of said trough and said housing.

3. The apparatus set forth in claim 1 wherein said reduced vane portion has a helical length of at least 180°.

4. The apparatus set forth in claim 1 wherein said reduced vane portion has a helical length of not more than 360°.

5. Apparatus as set forth in claim 1 including means connecting said trough, said housing, said shaft, said vane, and said driving means in an integral assembly, and means removably mounting said assembly on said bin.

References Cited

UNITED STATES PATENTS

| | | | |
|---|---|---|---|
| 1,557,773 | 10/1925 | Pilcher et al. | 198—64 X |
| 2,233,707 | 3/1941 | Nelson | 198—64 |
| 2,513,784 | 7/1950 | Blomquist | 198—64 |
| 2,990,942 | 7/1961 | Smith | 198—214 |
| 3,037,611 | 6/1962 | Majorowicz | 198—64 |
| 3,252,562 | 5/1966 | Brembeck | 198—64 |

GERALD M. FORLENZA, *Primary Examiner.*

EVON C. BLUNK, *Examiner.*

R. J. HICKEY, *Assistant Examiner.*